(12) United States Patent
Uozumi (10) Patent No.: US 6,479,180 B1
(45) Date of Patent: Nov. 12, 2002

(54) VEHICLE FUEL CELL SUPPORTING APPARATUS AND METHOD

(75) Inventor: Tetsuo Uozumi, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 98 days.

(21) Appl. No.: 09/615,056

(22) Filed: Jul. 12, 2000

(30) Foreign Application Priority Data

Jul. 16, 1999 (JP) .............................. 11-202546

(51) Int. Cl.⁷ .......................... H01M 2/02; H01M 10/16
(52) U.S. Cl. .................. 429/34; 429/30; 429/186; 429/153; 429/157; 429/159; 429/208
(58) Field of Search ................. 429/186, 153, 429/157, 159, 30, 34, 208

(56) References Cited

FOREIGN PATENT DOCUMENTS

| JP | 5-82157 | | 4/1993 | |
| JP | 405082153 A | * | 4/1993 | ............ H01M/8/24 |
| JP | 405082157 A | * | 4/1993 | ............ H01M/8/24 |

* cited by examiner

*Primary Examiner*—Patrick Ryan
*Assistant Examiner*—Angela J. Martin
(74) *Attorney, Agent, or Firm*—Foley & Lardner

(57) ABSTRACT

In a vehicle fuel cell supporting apparatus and method supporting a fuel cell formed by a plurality of unit cells, each of which is provided with an anode, a cathode, and an electrolyte film, and is laminated together with a separator intervening therebetween in a forward and rearward direction of the vehicle, relative movement, in a forward direction of the vehicle, of the cell element located at the front most position of the fuel cell with respect to the vehicle is blocked.

12 Claims, 5 Drawing Sheets

VEHICLE FUEL CELL SUPPORTING APPARATUS AND METHOD

BACKGROUND OF THE INVENTION

The present invention relates to a vehicle fuel cell supporting apparatus and method, and more particularly to a vehicle fuel cell supporting apparatus and method directed at improving the sealing of the fuel cell.

In recent years, there has been an investigation of causing an electrochemical reaction between a hydrogen-containing gas which is hydrogen-rich and an oxygen-containing gas and in the presence of a catalyst so as to use the electrical power generated in such a manner as a power supply for driving a vehicle.

In the Japanese Patent Application Laid-Open Publication H5-82157, there is a proposal of technology whereby a displaceable upper support plate and a spring mechanism are provided so as to restrain a fuel cell, thereby preventing a deterioration of the sealing of the fuel cell by vibration due to startup, stopping, and driving of the vehicle.

SUMMARY OF THE INVENTION

However, according to an investigation by the inventor, in the case in which such a fuel cell system is used as a mobile power supply, compared with the case of a fixed installation, such as in a chemical plant, additional consideration is required with regard to the following points.

First, more consideration must be given to safety.

Specifically, because a fuel cell uses a hydrogen-rich hydrogen-containing gas as a reactive gas, it is desirable to improve the sealing of the fuel cell during driving of the vehicle or the like. Further, if leakage of an electrolyte within the cell stack occurs, the performance of the fuel cell will decrease. Therefore, it is preferable from such a standpoint as well to improve the sealing of the fuel cell.

Secondly, consideration must be given to vibration toughness as well.

Specifically, in the case in which a fuel cell is used as a mobile power supply mounted in a vehicle, because startup, acceleration, running, deceleration, stopping or the like of the vehicle occur with great frequency, that is, because swaying and vibration are frequently generated by these events, there is a repeated load and impact load applied to the fuel cell. For this reason, if the vibration toughness is insufficient, spaces can develop in various parts of the fuel cell, and particularly between unit cells and spacers which make up the cell stack, and a shock can be applied to the separators, which are made of carbon and susceptible to the impact load.

Besides, in the case in which a fuel cell is mounted in a vehicle, among the inputs applied to the fuel cell, a large and frequent one corresponds to an acceleration that acts in the forward direction of the vehicle, such as when the vehicle is suddenly braked, or when the vehicle experiences a front-end collision. For this reason, to improve the sealing of the fuel cell, it is thought to be necessary to consider the supporting structure of the fuel cell in the forward direction more than in other directions of the vehicle.

However, in supporting structures of fuel cells in the past, there were no specific proposals with regard to such a point.

Specifically, in mounting a fuel cell in a vehicle, the situation is one in which there is a desire for a configuration in which sufficient consideration is given to improving the sealing in the fuel cell, and reducing the space that occurs between unit cells and separators making up the fuel cell, even in the case of sudden braking or the case of a front-end collision.

Accordingly, the present invention was made after the above-noted investigation and has an object to provide a vehicle fuel cell supporting apparatus that can effectively improve the sealing of the fuel cell and reduce the space that occurs between unit cells and separators making up the fuel cell, even in the case of sudden braking or the case of a front-end collision.

A vehicle fuel cell supporting apparatus according to the present invention supports a fuel cell of a vehicle, the fuel cell being formed by a plurality of unit cells, each of which is provided with an anode, a cathode, and an electrolyte film, and is laminated together with a separator intervening therebetween in a forward and rearward direction of the vehicle, and comprises: a first supporting member blocking relative movement, in a forward direction of the vehicle, of the cell element located at the front most position of the fuel cell with respect to the vehicle.

On other wards, according to the present invention, a vehicle fuel cell comprise: a plurality of unit cells, each of which is provided with an anode, a cathode, and an electrolyte film, and is laminated together with a separator intervening therebetween in a forward and rearward direction of the vehicle; and means for blocking relative movement, in a forward direction of the vehicle, of the cell element located at the front most position of the fuel cell with respect to the vehicle.

Besides, according to the present invention, a vehicle fuel cell supporting method supporting a fuel cell of a vehicle, the fuel cell being formed by a plurality of unit cells, each of which is provided with an anode, a cathode, and an electrolyte film, and is laminated together with a separator intervening therebetween in a forward and rearward direction of the vehicle, comprises: blocking relative movement, in a forward direction of the vehicle, of the cell element located at the front most position of the fuel cell with respect to the vehicle.

DETAILED DESCRIPTION OF THE PREFERRED EMBODIMENTS

Preferred embodiments of a vehicle fuel cell supporting apparatus and method according to the present invention are described in detail below, with references being made to relevant accompanying drawings.

Figure 1A:
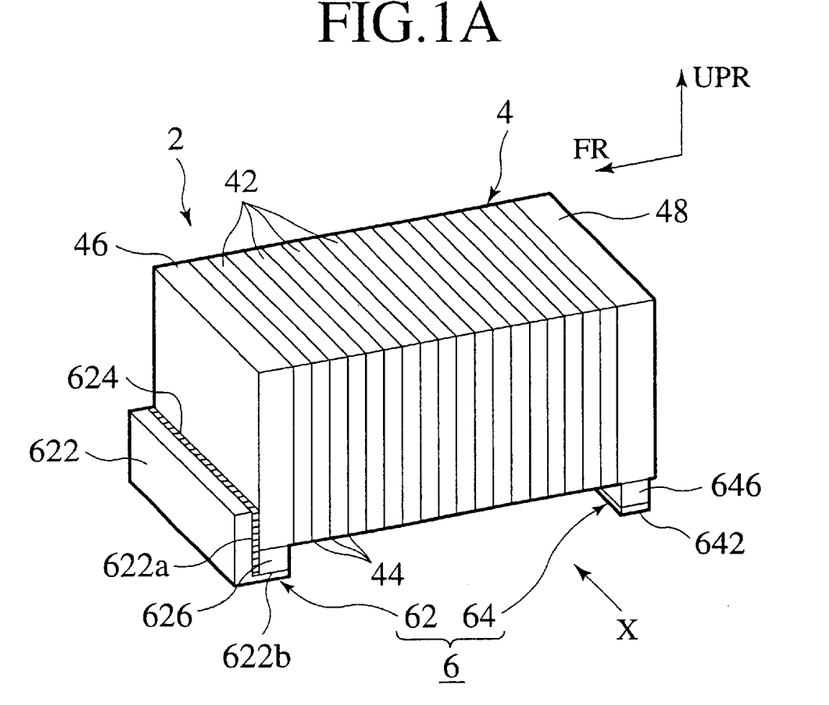
FIG. 1A is a perspective view showing the schematic configuration of a vehicle fuel cell supporting apparatus according to a first embodiment of the present invention.

A first embodiment of a vehicle fuel cell supporting apparatus and method is described in detail below, with references made to FIG. 1A to FIG. 2. In FIG. 1A, the arrow FR indicates the forward direction of the vehicle, and the arrow UPR indicates the upward direction of the vehicle.

First, the configuration of a vehicle fuel cell supporting apparatus according to this embodiment will be described.

Figure 1B:
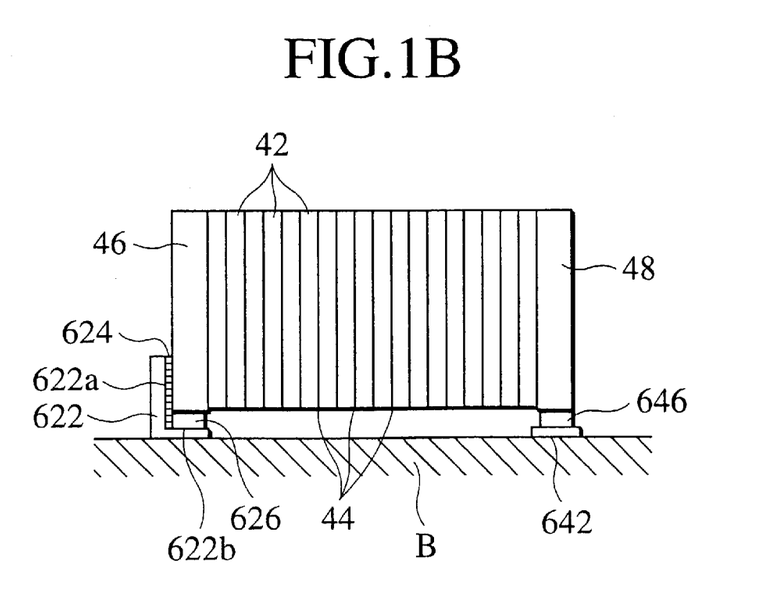
FIG. 1B shows a view of FIG. 1A from the X direction.

As shown in FIG. 1A and FIG. 1B, a vehicle fuel cell supporting apparatus 2 assumes mounting to a vehicle body B of, for example, an electrical vehicle or the like, as a driving power supply, and has a fuel cell 4 and a supporting member 6 that blocks movement, in the forward direction and to be described below, of an unit cell 42 which is located at the front most position of the fuel cell 4.

A solid-state high-polymer electrolyte type fuel cell is used for the fuel cell 4, in a so-called stack structure. This stack structure has a plurality of laminations of unit cells 42 which make up the fuel cell 4, with intervening separators 44, and is further sandwiched between a metal plate 46 toward the front of the vehicle (front side) and a metal plate 48 toward the rear of the vehicle (rear side). Of course, the plates 46 and 48 can also be made of a synthetic resin or the like which satisfies requirements for strength, for example. The fuel cell 4 is installed in the vehicle so that the lamination direction thereof is aligned with the forward and rearward direction of the vehicle.

Figure 2:
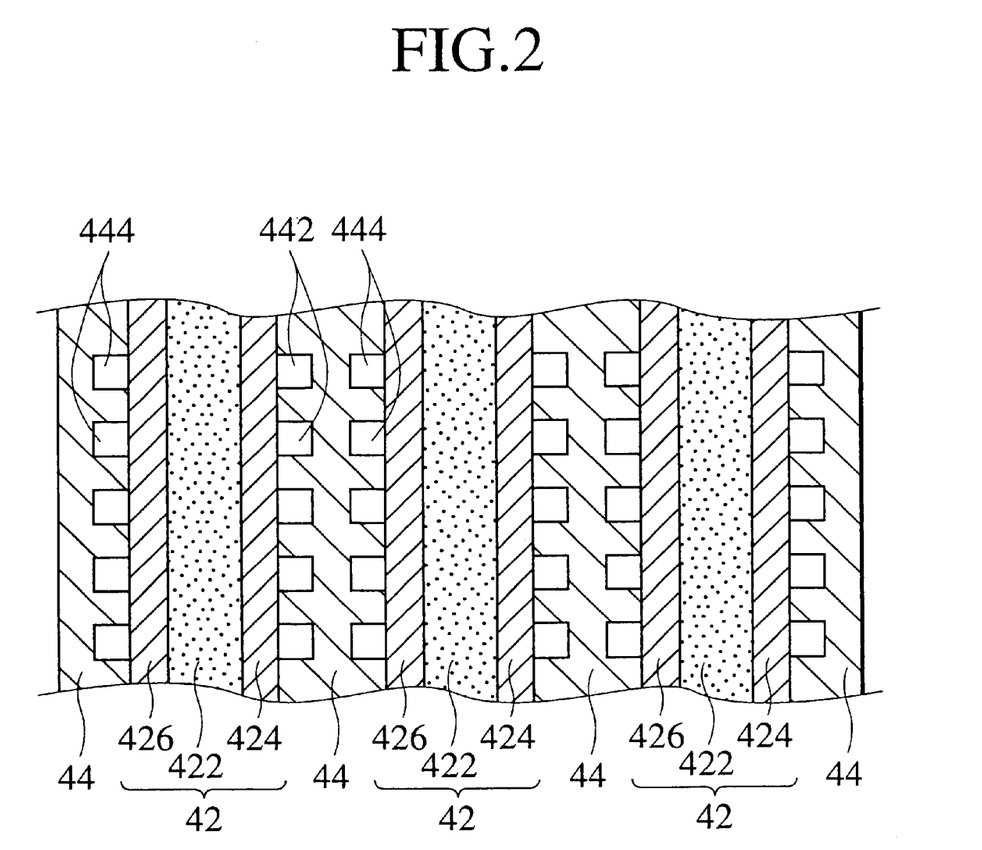
FIG. 2 is a partial cross-sectional view showing an example of an unit cell that makes up the fuel cell according to the embodiment.

Each unit cell 42, as shown in FIG. 2, is made up of an electrolyte film 422, and an anode 424 and cathode 426 pair that sandwiches the electrolyte film 422 therebetween.

Each electrolyte film 422 is formed by a solid-state high-polymer material such as an ion-exchange film having proton conductivity formed by a fluoride-based resin. Of course, it is further possible to apply an alloy of platinum and another metal as a catalyst onto the surface of the electrolyte film 422.

The anode 424 and the cathode 426 are gas-dispersing electrodes that form a structure sandwiching the electrolyte film from its both sides. Specifically, the anode 424 and the cathode 426 are formed by a carbon cloth made of a carbon-based fiber, or a carbon paper or carbon felt or the like formed by a carbon-based fiber.

Each separator 44 is laminated so as to provide hydrogen-containing gas flow paths 442 and oxygen-containing gas flow paths 444 between an opposing and neighboring anode 424 and cathode 426. This separator 44 is made of a gas non-permeable electrically conductive member, such as a dense carbon that is made non-permeable to gas by compression of carbon.

More specifically, the separator 44 has ribs on both surfaces thereof. The ribs on one surface forms hydrogen-containing gas flow paths 442 between it and the anode 424, and the ribs on the other surface forms oxygen-containing gas flow paths 444 between it and the cathode 426. This is, of course, not a particular restriction, and it is possible to use two members that have ribs on only one surface thereof, thereby forming flow paths to one electrode, and to stack these so as to form flow paths to the other electrode. It is further possible to use a combination thereof. Also, it is sufficient that the separators 44 positioned at the ends of the stacked structure have ribs on only one surface thereof, this being the surface that is in contact with the gas-dispersing electrode (refer to the end parts shown in FIG. 2).

In any of the above-noted cases, the separator 44 forms gas flow paths with respect to a pair of gas-dispersing electrodes, and also serves to separate the flows of oxygen-containing gas and hydrogen-containing gas between adjacent unit cells. When forming ribs on both surfaces of the separator, there is no particular need for the ribs to be formed parallel on the two surfaces, and it is possible for them to be respectively formed at a predetermined angle. The shape of the ribs further need not be the shape of parallel grooves, and can be another shape, as long as it is possible to supply hydrogen-containing gas and oxygen-containing gas to the gas-dispersing electrodes.

The supporting member 6 is formed by a first supporting member 62 that supports the plate 46 toward the front of the vehicle (front side) with respect to the vehicle body B, and a second supporting member 64 that supporting the plate 48 toward the rear of the vehicle (rear side) with respect to the vehicle body B.

The first supporting member 62 effectively receives a force that acts on the fuel cell 4 so as to cause its relative movement in the forward direction, in the case, for example, of sudden braking or a front-end collision, so as to block such movement.

More specifically, the first supporting member 62 is provided with a supporting part 622 whereby the fuel cell 4 is substantially non-movable in the forward direction and movable in the upward and downward direction of the vehicle, an insulating part 624 for the purpose of preventing electrical leakage, and a shock-absorbing part 626 for absorbing upward and downward vibration of the vehicle body. The insulating part 624 is a planar sheet, provided between an inner standing part 622a of the supporting part 622 and the fuel cell 4. The shock-absorbing part 626 is a planar sheet, provided between an inner horizontal part 622b of the supporting part 622 and the fuel cell 4.

The second supporting member 64 is a member such that the fuel cell 4 is movable in the forward and rearward direction in the case sudden braking, sudden stopping, sudden acceleration, or sudden deceleration, and is formed by a supporting part 642 that enables any of forward, rearward, upward, and downward movement of the fuel cell 4, and a shock-absorbing member 646 for absorbing upward and downward vibration of the vehicle.

The supporting parts 622 and 642 are metal, although they can, of course, be made of a synthetic resin, as long as the requirements for strength or the like are satisfied. The insulating member 624 is synthetic resin, although it can also be made of another material, as long as it satisfies the requirements of insulation or the like, and the shock-absorbing members 626 and 646 are made of rubber, although these can be made of another material, as long as the requirements of shock absorption or the like are satisfied.

Next, the operation of the vehicle fuel cell supporting apparatus 2 according to the embodiment is described below.

If a vehicle into which the vehicle fuel cell supporting apparatus 2 is mounted is in driving, and, for example, is suddenly braked, in the same manner that a forward-acting acceleration applies on a passenger therein, the fuel cell 4 mounted in the vehicle and also the various constituent elements of the fuel cell 4, which are the unit cells 42 and separators 44, are also acted upon by an acceleration in the forward direction of the vehicle. This is the same in the case in which a vehicle being driven experiences a front-end collision.

That is, in suddenly braking the vehicle or the like, the fuel cell 4 is going to move relatively forward with respect to the vehicle.

In this case, the second supporting member 64 that is disposed at the rear end of the fuel cell 4 with respect to the vehicle allows the fuel cell 4 to move in the forward and rearward direction, so that movement thereby in the forward direction is inherently allowed substantially without resistance.

In contrast, the first supporting member 62 that is disposed at the front end of the fuel cell 4 with respect to the vehicle allows the fuel cell 4 to move in the upward and downward direction, but does not substantially allow the fuel cell 4 to move in the forward direction, so that with regard to the front part of the fuel cell 4 with respect to the vehicle, the force corresponding to this acceleration is surely resisted. Thus, the position of the front part of the fuel cell 4 remains substantially in place.

Accordingly, with regard to the relationship between the unit cells 42 and separators 44 that form the fuel cell 4, a force acts that tends to narrow each spacing therebetween, so that the spacing between the unit cells 42 and the separators 44 is narrowed. That is, the sealing of the fuel cell 4 is efficiently improved.

In the running condition of the vehicle, there is vibration applied also in the upward and downward direction. However, the shock-absorbing members 626 and 646 effectively reduces the vibration which is transmitted to the unit cells 42 and the separators 44 of the fuel cell 4.

Additionally, because the fuel cell 4 is supported through the insulating part 624 with respect to the first supporting member 62, electrical leakage is effectively prevented.

According to the configuration of this embodiment as described above, in the case in which a vehicle is suddenly braked or the like, the supporting member 6 resists the force corresponding to an acceleration occurring in the forward direction of the vehicle, so that the front part of the fuel cell 4 remains substantially in place, and furthermore the force applied to the rear part of the fuel cell 4 is not substantially resisted, so that the movement, toward the front of the vehicle, of the rear part of the fuel cell 4 is possible. Thus, as a result, a force acts so as to narrow each spacing between the unit cells 42 and separators 44 making up the fuel cell 4, thereby effectively improving the sealing of the fuel cell 4.

Because both the first supporting member 62 and the second supporting member 64 use the shock-absorbing members 626 and 646, it is possible to reduce the upward and downward vibration that is transmitted to the fuel cell 4 during running of the vehicle and, by extension, to effective reduce the occurrence of splitting in constituent elements which are susceptible to such shock loads, particularly the separators 44.

Additionally, the fuel cell 4 is supported by the first supporting member 62 through the insulating member 624, it is possible to effectively prevent electrical leakage.

A vehicle fuel cell supporting apparatus and method according to a second embodiment of the present invention are described below, with references made to FIG. 3 and FIG. 4, in which the arrow FR indicates the forward direction of the vehicle and the arrow UPR indicates the upward direction of the vehicle.

Figure 3:
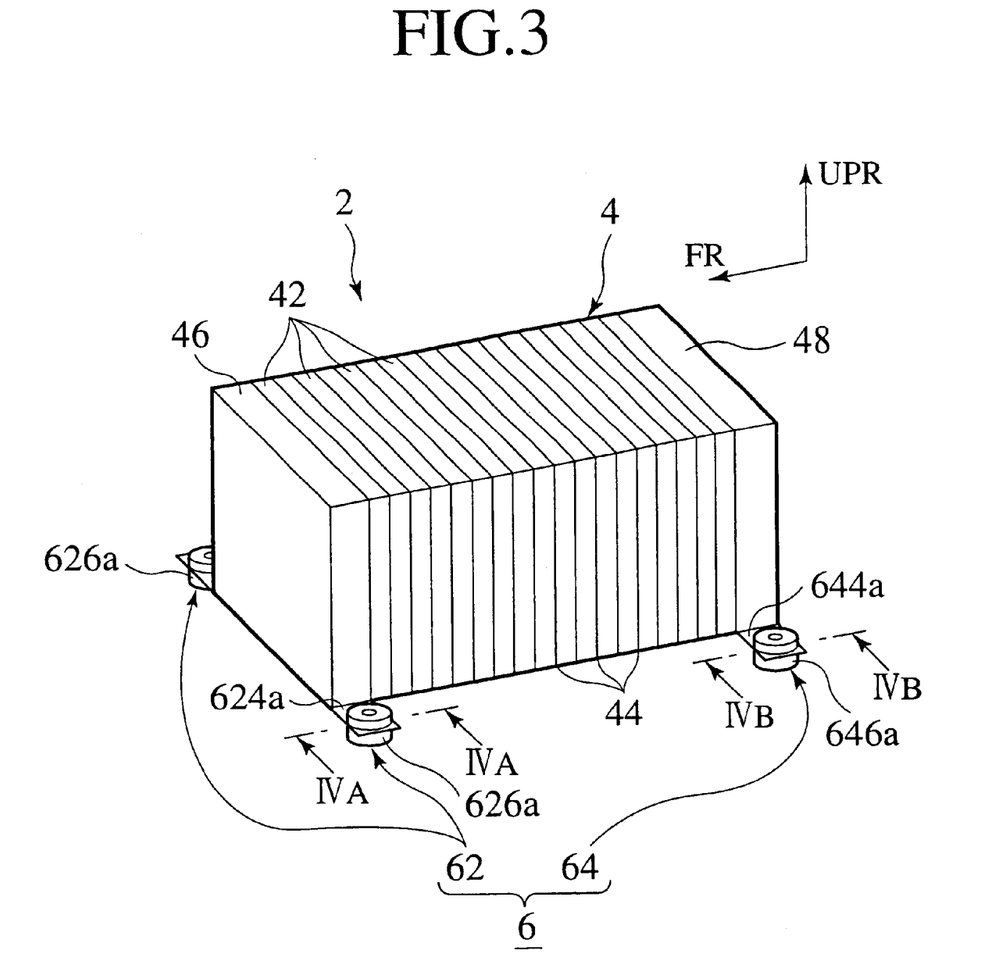
FIG. 3 is a perspective view showing the schematic configuration of a vehicle fuel cell supporting apparatus according to a second embodiment of the present invention.

In this embodiment, as shown in FIG. 3, a supporting member 6 that blocks movement of the unit cells 42, particularly that of the unit cell 42 located at the front most position of the fuel cell 4, is provided. The supporting member 6 is formed by a first supporting member 62 that supports the plate 46 toward the front of the vehicle, and second supporting member 64 that supports the plate 48 toward the rear of the vehicle. That is, this is similar to the case of the first embodiment.

In this embodiment, however, in contrast to the first embodiment, the first supporting member 62 has high rigidity at least with respect to the forward and rearward direction of the vehicle, and is provided with two shock-absorbing members 626a made of hard rubber or synthetic resin. The second supporting member 64 has low rigidity at least with respect to the forward and rearward direction, and is provided with two shock-absorbing member 646a made of soft rubber or synthetic resin.

Figure 4A:
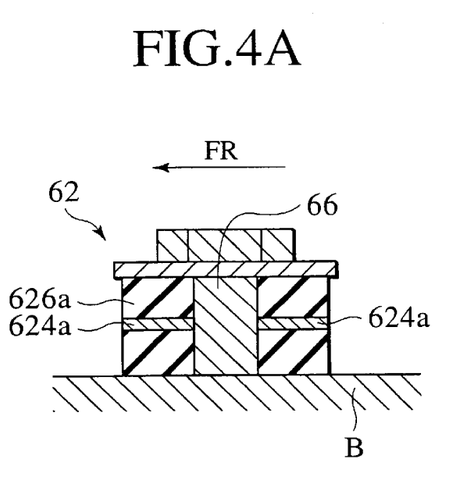
FIG. 4A is a cross-sectional view along the IVA—IVA line of FIG. 3.
Figure 4B:
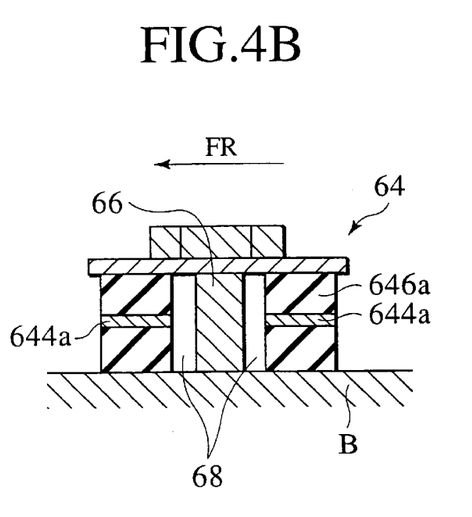
FIG. 4B is a cross-sectional view along the IVB—IVB line of FIG. 3.

More specifically, although omitted from FIG. 3, as shown in FIG. 4A and FIG. 4B, each of the shock-absorbing members 626a and 646a is cylindrical bushing having a through hole formed substantially in the center part thereof. Also, each has the spring constant in the radial direction, at least corresponding to the forward and rearward direction, is made smaller than the spring constant in the axial direction, corresponding to the upward and downward direction. And also, the spring constant in the radial direction of the shock-absorbing member 626a is made larger than the spring constant in the radial direction of the shock-absorbing member 646a. These characteristics can be achieved by appropriate selection of materials and/or cross-sectional shapes.

The shock-absorbing members 626a and 646a are fixed to the vehicle body B through a through hole using, for example, a fastening member 66, such as a bolt, a nut, or the like.

Additionally, as to the shock-absorbing member 646a of the second supporting member 64 disposed toward the rear of the vehicle, the diameter of a through hole 68 is made larger than the diameter of the fastening member 66, so as to provide a space with respect to the fastening member 66. By providing this space, the shock-absorbing member 646a is deformable substantially without interference with respect to the fastening member 66, by the action of a force corresponding to an acceleration of the fuel cell 4 in the forward direction. That is, even by the second supporting member 64 of this embodiment, it is configured so as to permit reliable movement of the rear of the fuel cell 4 in the forward direction.

In FIG. 3 and FIG. 4, the reference numerals 624a and 644a are insulating members, which provide communication with sufficient mechanical strength while providing electrical insulation between the fuel cell 4 and the shock-absorbing member 626a and between the fuel cell 4 and the shock-absorbing member 646a.

When a vehicle into which the vehicle fuel cell supporting apparatus 2 having the above-described configuration is suddenly braked or the like, for example, an acceleration in the forward direction occurs so that the fuel cell 4 is going to move in the forward direction relatively to the vehicle body.

In this embodiment, the shock-absorbing member 646a of the supporting member 64 that supports the rear-side plate 48 of the fuel cell 4 is configured so as to have a low rigidity at least in the forward direction, and also the diameter of the through hole provided in the shock-absorbing member 646a is made larger than the diameter of the fastening member 66. Therefore, the deformation of the shock-absorbing member 646a is not substantially restricted, and the rear part of the fuel cell 4 is going to move in the forward direction.

In contrast to this, the shock-absorbing member 646a of the first supporting member 62 that supports the front-side plate 46 of the fuel cell 4 is configured so as to have a high rigidity at least in the forward and rearward direction. Therefore, the front part of the fuel cell 4 has a movement toward the front that is sufficiently small compared to the movement to be allowed at the rear part thereof.

Thus, according to the vehicle fuel cell supporting apparatus 2 configured as described above, in the case in which the vehicle is suddenly braked or the like, the spaces between the unit cells 42 and separators making up the fuel cell 4 narrow, thereby enabling an effective improvement in the sealing of the fuel cell 4.

Because both the first supporting member 62 and the second supporting member 64 have the shock-absorbing members 626a and 646a, it is possible to reduce the upward and downward transmitted to the fuel cell 4 when the vehicle is being driven, thereby effectively preventing splitting of the separators 44.

Additionally, because the fuel cell 4 is supported through the insulating member 624a and 644a to the first supporting member 62 and the second supporting member 64, it is possibly to effectively prevent electrical leakage.

In this embodiment, it will be readily understood that there is no particular restriction on the number of shock-absorbing members 626a and 646a.

Figure 5A:
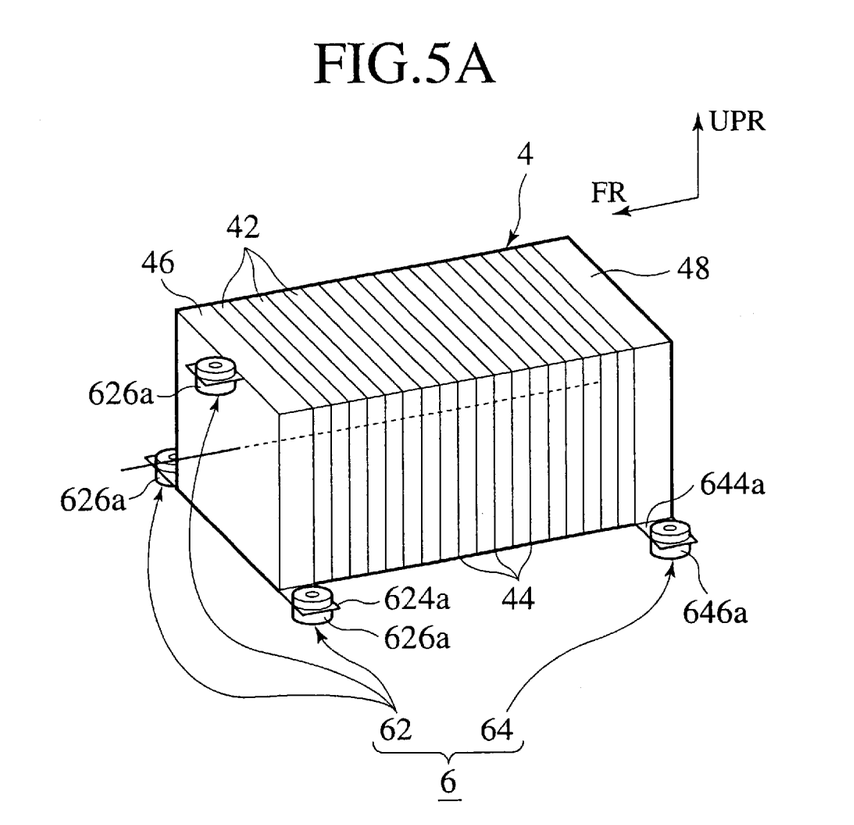
FIG. 5A is a perspective view showing the schematic configuration of a vehicle fuel cell supporting apparatus according to a third embodiment of the present invention.
Figure 5B:
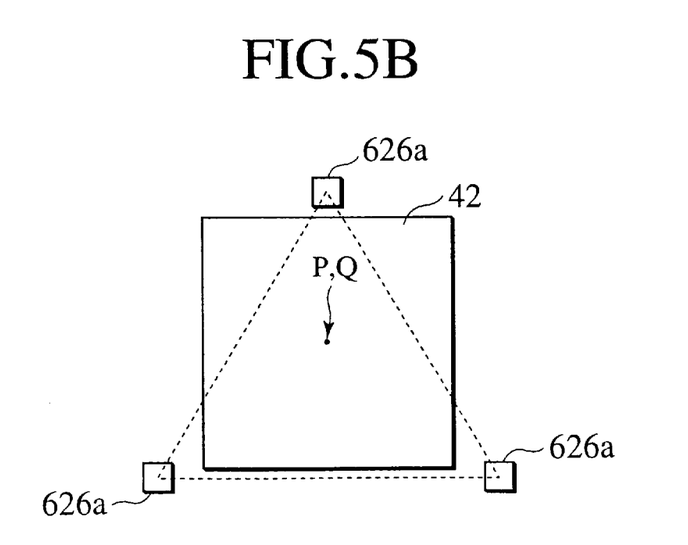
FIG. 5B is a drawing showing the relationship between the resultant center of resilience of a first supporting member and the center of gravity of unit cells making up the fuel cell.

Next, a vehicle fuel cell supporting apparatus and method according to a third embodiment of the present invention is described in detail, with references being made to FIG. 5A and FIG. 5B, in which the arrow FR indicates the forward direction of the vehicle and the arrow UPR indicates the upward direction of the vehicle.

In this embodiment, as shown in FIG. 5A, a supporting member 6 that blocks movement of the unit cells 42, particularly that of an unit cell 42 located at the front most position of the fuel cell 4, is provided. The supporting member 6 is provided with a first supporting member 62 that supports the plate 46 toward the front, and second supporting member 64 that supports the plate 48 toward the rear. This is the same as in the cases of the first and second embodiments. The first supporting member 62 has a shock-absorbing member 626a having a high rigidity at least in the forward and rearward direction, and the second supporting member 64 has a shock-absorbing member 646a having a low rigidity at least in the forward and rearward direction. This is the same as in the second embodiment.

That is, the supporting relationship of the fuel cell 4 by the first supporting member 62 and the second supporting member 64 in this embodiment is such that the rear end of the fuel cell 4 can move forward with respect to the vehicle.

In this embodiment, however, as shown schematically in FIG. 5B, in particular the first supporting member 62 comprises a plurality of shock-absorbing members 626a. As to the plurality of shock-absorbing members 626a, so-called resultant center of resilience P of the plurality of shock-absorbing members 626a with respect to the forward direction and the overall center of gravity Q of the unit cells 42 making up the fuel cell 4 (synthesized from each of the centers of gravity of the unit cells 42) coincide with each other, as seen from the forward and rearward direction. This distinguishes the third embodiment.

Additionally, in this embodiment as well, similar to the second embodiment, although it is omitted in FIG. 5A and FIG. 5B, the shock-absorbing members 626a and 646a are fixed to the vehicle through a through hole using, for example, a fastening member, and at the second supporting member 64 toward the rear, the diameter of the through hole is made larger than the fastening member.

In FIG. 5A, the reference numerals 644a and 624a denote insulating members.

Thus, according to the vehicle fuel cell supporting apparatus 2 according to this embodiment as well, when a vehicle into which the vehicle fuel cell supporting apparatus 2 is mounted is suddenly braked or the like, for example, an acceleration in the forward direction is imparted, and the fuel cell 4 that receives a force corresponding to this acceleration is going to move forward relative to the vehicle that is being braked. However, because the first supporting member 62 has a shock-absorbing member 626a having a high rigidity at least in the forward and rearward direction and the second supporting member 64 has a shock-absorbing member 646a having a low rigidity at least in the forward and rearward direction, the spaces between the unit cells 42 and separators 44 making up the fuel cell 4 narrow, thereby enabling an effective improvement in the sealing of the fuel cell 4.

Additionally, since the first supporting member 62 is provided with a plurality of shock-absorbing members 626a, and the plurality of shock-absorbing members 626a is disposed such that the resultant center of resilience P thereof with respect to the forward direction and the overall center of gravity of the unit cells 42 making up the fuel cell 4 coincide with each other at least as seen in the forward and rearward direction, a force corresponding to an acceleration acting on the fuel cell 4 in the forward direction substantially acts on the resultant center of resilience P of the plurality of shock-absorbing members 626a with respect to the forward direction, so that there is effective suppression of an excessive moment that would have occurred in the fuel cell 4.

For this reason, the force with respect to the unit cells 42 making up the fuel cell 4 is substantially applied uniformly, therefore effectively suppressing the occurrence of an excessive space between multiple laminations of unit cells 42 and separators 44, and enabling an improvement in the sealing of the fuel cell 4.

In addition, because the diameter of the through hole provided in the shock-absorbing member 646a at the rear side is made larger than the fastening member (not shown in FIG. 5A and FIG. 5B), and because together with the vehicle-side end of the shock-absorbing member 646a fixed to the vehicle body, the fuel cell-side end of the shock-absorbing member 646a can move in the forward and rearward direction, the rear end part of the fuel cell 4 is moves more reliably forward, thereby more effectively suppressing the occurrence of spacing at the end parts between the unit cells 42 and the separators 44.

Although this embodiment is described for the example in which the plurality of shock-absorbing members 626a of the first supporting member 62 are disposed so that the resultant center of resilience P of the plurality of shock-absorbing members 626a with respect to the forward direction and the overall center of gravity Q of the unit cells 42 making up the fuel cell 4 coincide at least in the forward and rearward direction, it will be understood that this is not imposed as a restriction.

For example, it is possible to have the plurality of shock-absorbing members 626a of the first supporting member 62 disposed so that the overall center of gravity Q of the unit cells 42 is on the inside of a region surrounded by the plurality of shock-absorbing members 626a (region surrounded by the broken line in FIG. 5B), viewed from the forward and rearward direction. In this configuration as well, the point of action of a force corresponding to an acceleration occurring in the forward direction applied to the fuel cell 4, is included within the region surrounded by the plurality of shock-absorbing members 626a, and it is possible to effectively suppress the occurrence of an excessive moment acting on the fuel cell 4.

It will further be readily understood that, in this embodiment as well, there is no particular restriction placed on the number of shock-absorbing members 626a and 646a.

In the foregoing embodiments, although the descriptions are for the example in which the direction of lamination of unit cells and the direction of an acceleration were the forward and rearward direction, it will be understood that this is not a restriction, and that, as necessary, the directions can be established as appropriate.

The entire contents of a Patent Application No. TOKUGANHEI 11-202546 with a filing date of Jul. 16, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed:

1. A vehicle fuel cell supporting apparatus supporting a fuel cell of a vehicle, the fuel cell being formed by a plurality of unit cells, each of which is provided with an anode, a cathode, and an electrolyte film, and is laminated together with a separator intervening therebetween, comprising:

a first supporting member blocking relative movement, in a forward direction of the vehicle, of the cell element located at the front most position of the fuel cell with respect to the vehicle.

2. A vehicle fuel cell supporting apparatus supporting a fuel cell of a vehicle, the fuel cell being formed by a plurality of unit cells, each of which is provided with an anode, a cathode, and an electrolyte film, and is laminated together with a separator intervening therebetween, comprising:

a first supporting member blocking relative movement, in a forward direction of the vehicle, of the cell element located at the front most position of the fuel cell with respect to the vehicle, and a second supporting member allowing relative movement of the fuel cell in the forward and rearward direction of the vehicle, and disposed further to the rear of the vehicle than the first supporting member, wherein the plurality of unit cells are laminated in a forward and rearward direction of the vehicle.

3. A vehicle fuel cell supporting apparatus according to claim 1, wherein the first supporting member has a supporting part, an insulating member provided between the supporting part and the fuel cell, and a shock-absorbing member provided between the supporting part and the fuel cell.

4. A vehicle fuel cell supporting apparatus according to claim 3, wherein the insulating member is provided between an internal standing part of the supporting part and the fuel cell, and the shock-absorbing member is provided between an internal horizontal part of the supporting part and the fuel cell.

5. A vehicle fuel cell supporting apparatus according to claim 2, wherein the second supporting member has a supporting part, and an insulating member provided between the supporting part and the fuel cell.

6. A vehicle fuel cell supporting apparatus according to claim 1, wherein the first supporting member has a shock-absorbing member having a relatively high rigidity at least in the forward and rearward direction of the vehicle.

7. A vehicle fuel cell supporting apparatus according to claim 2, wherein the second supporting member has a shock-absorbing member having a relatively low rigidity at least in the forward and rearward direction of the vehicle.

8. A vehicle fuel cell supporting apparatus according to claim 7, wherein the shock-absorbing member of the second supporting member has a through hole through which a fastening member passes, and a diameter of the through hole is larger than the fastening member.

9. A vehicle fuel cell supporting apparatus according to claim 1, wherein the first supporting member has a plurality of shock-absorbing members, and a resultant center of resilience of the plurality of shock-absorbing members coincides with a center of gravity of the plurality of laminations of unit cells of the fuel cell with respect to the forward direction of the vehicle.

10. A vehicle fuel cell supporting apparatus according to claim 1, wherein the supporting member has a plurality of shock-absorbing members disposed so that a center of gravity of the plurality of laminations of unit cells of the fuel cell falls within a region surrounded by the plurality of shock-absorbing members.

11. A vehicle fuel cell comprising: a plurality of unit cells, each of which is provided with an anode, a cathode, and an electrolyte film, and is laminated together with a separator intervening therebetween in a forward and rearward direction of the vehicle; and means for blocking relative movement, in a forward direction of the vehicle, of the cell element located at the front most position of the fuel cell with respect to the vehicle.

12. A vehicle fuel cell supporting method supporting a fuel cell of a vehicle, the fuel cell being formed by a plurality of unit cells, each of which is provided with an anode, a cathode, and an electrolyte film, and is laminated together with a separator intervening therebetween, comprising:

blocking relative movement, in a forward direction of the vehicle, of the cell element located at the front most position of the fuel cell with respect to the vehicle, wherein the plurality of unit cells are laminated in a forward and rearward direction of the vehicle.

\* \* \* \* \*